US008066223B2

(12) United States Patent
Hale et al.

(10) Patent No.: US 8,066,223 B2
(45) Date of Patent: Nov. 29, 2011

(54) ENHANCED AERIAL DELIVERY SYSTEM (75) Inventors: John C. Hale, McMinnville, OR (US); Christopher B. Harris, Amity, OR (US); William D. McCune, Tehachapi, CA (US)

(73) Assignee: Evergreen International Aviation, Inc., McMinnville, OR (US)

( * ) Notice: Subject to any disclaimer, the term of this patent is extended or adjusted under 35 U.S.C. 154(b) by 0 days.

(21) Appl. No.: 12/837,181

(22) Filed: Jul. 15, 2010

(65) Prior Publication Data

US 2010/0282914 A1    Nov. 11, 2010

Related U.S. Application Data

(63) Continuation of application No. 11/681,147, filed on Mar. 1, 2007, now Pat. No. 7,819,362.

(51) Int. Cl.
*B64D 1/16* (2006.01)

(52) U.S. Cl. ........ 244/136; 239/171; 169/53; 137/699.2

(58) Field of Classification Search .............. 244/118.1, 244/118.2, 136, 137; 169/53; 239/171; 222/67; 137/899.2
See application file for complete search history.

(56) References Cited

U.S. PATENT DOCUMENTS

| | | |
|---|---|---|
| 1,911,431 A | 5/1933 | Cawley |
| 1,997,669 A | 4/1935 | Arcieri |
| 2,242,705 A | 5/1941 | Gordon |
| 2,412,729 A | 12/1946 | Hall |
| 2,426,771 A | 9/1947 | Harp |
| 2,493,017 A | 3/1950 | Nutter |
| 2,926,688 A | 3/1960 | Muma et al. |
| 3,547,000 A | 12/1970 | Haberkorn et al. |
| 3,643,677 A | 2/1972 | Begleiter |
| 3,698,480 A | 10/1972 | Newton |
| 3,828,857 A | 8/1974 | Mason |
| 3,925,984 A | 12/1975 | Holleyman |
| 3,965,988 A | 6/1976 | Wesson et al. |
| 3,995,328 A | 12/1976 | Carolan et al. |
| 4,070,714 A * | 1/1978 | Bishton et al. .................... 4/318 |
| 4,172,499 A | 10/1979 | Richardson et al. |
| 4,195,693 A | 4/1980 | Busch et al. |
| 4,202,061 A | 5/1980 | Waters |
| 4,208,949 A | 6/1980 | Boilsen |
| 4,531,588 A | 7/1985 | Brunsicke |
| 4,729,434 A | 3/1988 | Rohrbach |
| 5,090,639 A | 2/1992 | Miller et al. |
| 5,242,023 A | 9/1993 | Terry et al. |
| 5,261,440 A | 11/1993 | Frank |
| 5,326,053 A | 7/1994 | Pahl et al. |

(Continued)

FOREIGN PATENT DOCUMENTS

GB          564771         11/1948

(Continued)

*Primary Examiner* — Benjamin P Lee (74) *Attorney, Agent, or Firm* — Davis Wright Tremaine LLP; George C. Rondeau, Jr.

(57) ABSTRACT

An enhanced aerial delivery system addresses issues raised when large quantities of fluids, powders, and other agent materials are to be transported in and aerially dispersed by aircraft. Some aspects include positioning and securing of tanks aboard the aircraft to facilitate management and safety of the tanks and aircraft. Other aspects address coupling of the tanks and associated piping to lessen structural effects upon the aircraft. Further aspects deal with channeling, containing, and dumping stray agent materials that have escaped from the agent tanks on board the aircraft.

1 Claim, 11 Drawing Sheets

U.S. PATENT DOCUMENTS

| | | | |
|---|---|---|---|
| 5,385,208 A | 1/1995 | Baker et al. | |
| 5,607,020 A | 3/1997 | Gebhardt | |
| 5,655,732 A | 8/1997 | Frank | |
| 5,769,124 A | 6/1998 | Ehrhardt | |
| 5,980,756 A * | 11/1999 | Tracy et al. | 210/744 |
| 6,314,986 B1 | 11/2001 | Zheng et al. | |
| 6,622,966 B1 | 9/2003 | McConnel, Sr. | |
| 6,626,375 B1 | 9/2003 | Ireland | |
| 6,769,493 B1 | 8/2004 | Fima et al. | |
| 7,165,627 B2 | 1/2007 | Hutter et al. | |
| 7,413,145 B2 | 8/2008 | Hale et al. | |
| 2002/0121382 A1 | 9/2002 | Fima et al. | |
| 2003/0201000 A1 | 10/2003 | Worm et al. | |
| 2004/0016848 A1 | 1/2004 | Jakubowski et al. | |
| 2005/0017131 A1 | 1/2005 | Hale et al. | |
| 2006/0260826 A1 | 11/2006 | Hutter et al. | |
| 2009/0065646 A1 | 3/2009 | Hale et al. | |

FOREIGN PATENT DOCUMENTS

| | | |
|---|---|---|
| GB | 2163710 | 3/1986 |

* cited by examiner

ENHANCED AERIAL DELIVERY SYSTEM

CROSS-REFERENCE TO RELATED APPLICATION

This application is a continuation of U.S. patent application Ser. No. 11/681,147 filed Mar. 1, 2007.

BACKGROUND OF THE INVENTION

1. Field of the Invention

The present invention is directed in general to aerial delivery systems.

2. Description of the Related Art

In general, aerial delivery systems receive, transport, and disperse fluids, powders, or other substances from aircraft to terrain below for various reasons. In certain cases including fire fighting, weather control, decontamination exercises, and geotechnical applications, it is desirable for large quantities of materials to be dispersed with each trip of the aircraft since areas for dispersion of the materials can be vast, travel distances between receiving and dispersion points can be great and response time to complete a job can be demanding. These and other applications where large quantities of materials are to be aerially dispersed present particular issues regarding aircraft control, safety and other issues that unfortunately conventional approaches have not addressed.

The invention will best be understood by reference to the following detailed description of the preferred embodiment, taken in conjunction with the accompanying drawings. The discussion below is descriptive, illustrative and exemplary and is not to be taken as limiting the scope defined by any appended claims.

DETAILED DESCRIPTION OF THE INVENTION

An enhanced aerial delivery system is described herein that addresses issues raised when large quantities of fluids, powders, and other agent materials are to be transported in and aerially dispersed by aircraft. Some aspects include positioning and securing of tanks aboard the aircraft to facilitate management and safety of the tanks and the aircraft. Other aspects address coupling of the tanks and associated piping to lessen structural effects upon the aircraft. Further aspects deal with channeling, containing, and dumping stray agent materials that have escaped from the agent tanks on board the aircraft.

Figure 1:
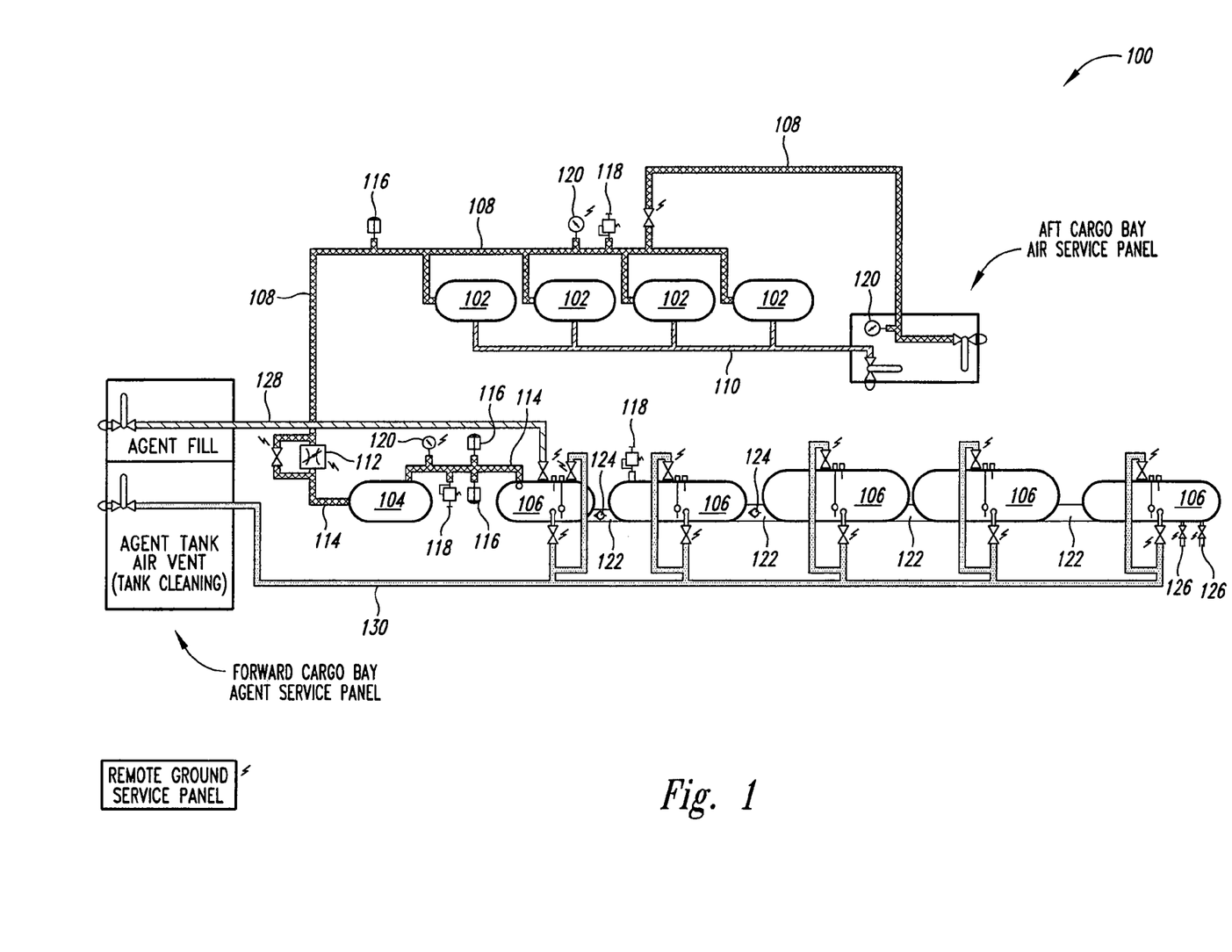
FIG. 1 is a schematic view of an enhanced aerial delivery system.

A tank circuit 100 is shown in FIG. 1 to include a set of propellant tanks 102, a proximate propellant tank 104, and a set of agent tanks 106. The propellant tanks 102 can supply propellant, such as compressed air, through high pressure propellant piping 108 while the tank circuit 100 is within accessible distance of an air supply generally on the ground at a servicing airport (not shown). A condensate piping 110 is used to carry off condensate from the set of the propellant tanks 102 generally also during a servicing period when the tank circuit 100 is not airborne at a servicing airport.

The high pressure propellant piping 108 is also coupled to a pressure regulator 112 that reduces pressure of propellant going into a low pressure propellant piping 114 to feed the proximate propellant tank 104. Additional low pressure propellant piping 114 carries propellant from the proximate propellant tank 104 to the set of the agent tanks 106. Burst disks 116, pressure relief valves 118, and pressure sensors 120 are placed at various points in the tank circuit 100 to guard against dangerous over-pressure conditions.

The agent tanks 106 are coupled together with agent piping 122 with the first two sections of agent piping nearest the proximate propellant tank 104 each containing a one way valve 124 that allows the flow of propellant and agent only away from the proximate propellant tank. Outlet valves 126 are coupled to the agent tank 106 in the tank circuit 100 that is farthest from the proximate propellant tank 104. The outlet valves 126 allow agent and propellant to escape from the tank circuit 100 as described further below.

An agent supply piping 128 is coupled to the agent tank 106 nearest the proximate tank 104 to be used for filling the agent tanks 106 with agent material when the tank circuit 100 is being serviced on the ground. Vent piping 130 is coupled to each of the agent tanks 106 to receive left over agent material and/or propellant when the agent tanks are being flushed with propellant. The vent piping 130 is used to vent the tanks during fill, regulating tank fill levels. The vent piping is used during ground cleaning to direct water to valves on lower portions of the agent tanks 106 to route cleaning agent to spray heads located inside the agent tanks.

Figure 2:
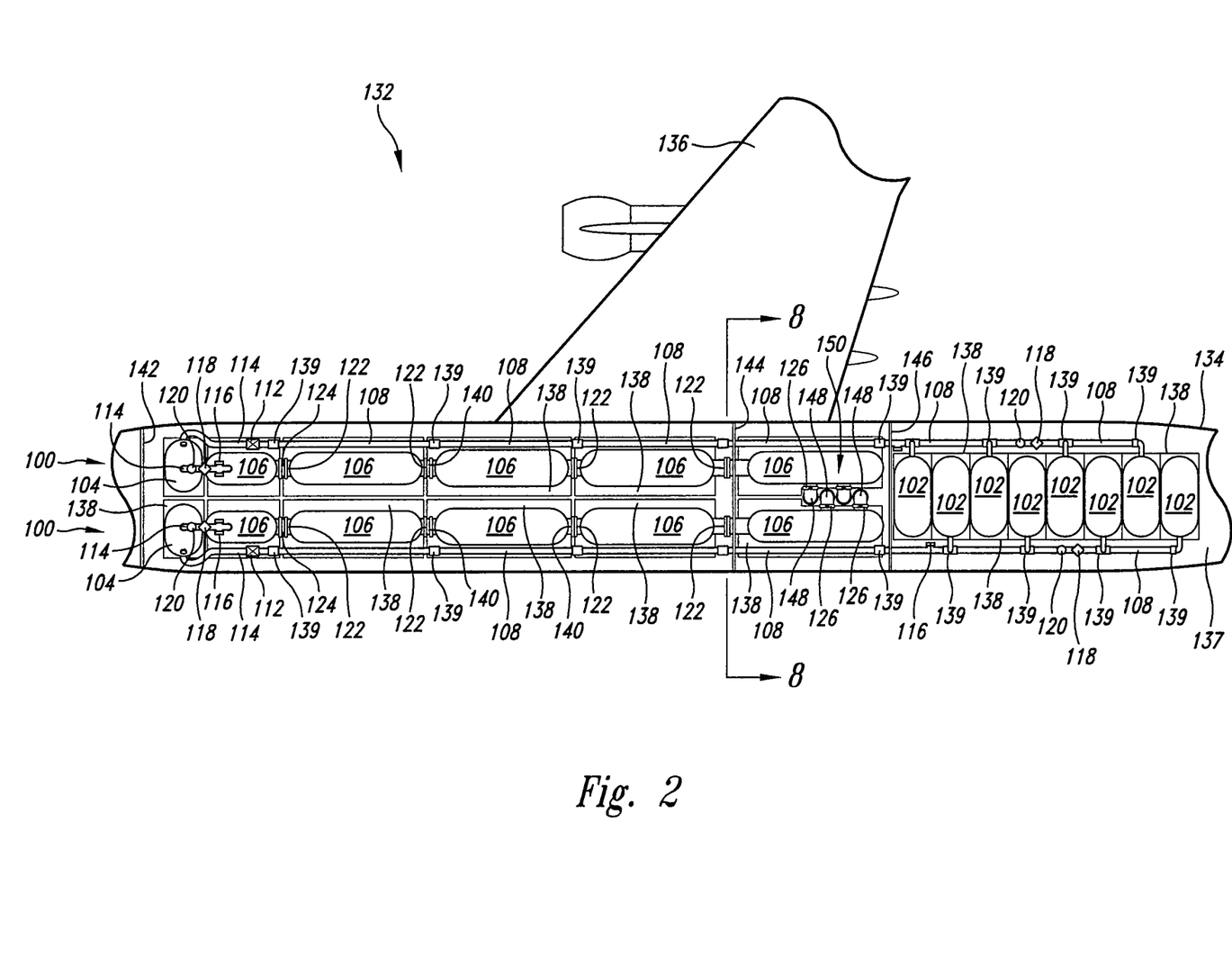
FIG. 2 is a top plan view of the enhanced aerial delivery system shown positioned within an aircraft.

An aircraft 132 is shown in FIG. 2 as having a fuselage 134, center wings 136 (one shown), an upper deck 137 and two of the tank circuits 100 on the upper deck. One of the tank circuits 100 generally occupies a port portion of the aircraft and the other of the two tank circuits occupies a starboard portion of the aircraft. Each of the tanks of the tank circuits 100 are positioned on individual pallets 138, which are secured to the aircraft using conventional pallet handling methods. As shown in FIG. 2, flexible couplers 139 are placed along various positions of the high pressure propellant piping 108 and low pressure propellant piping 114, and flexible couplers 140 are coupled with agent piping 122. The flexible couplers 139 and the flexible couplers 140 add structural flexibility to the tank circuits 100 so that the tank circuits impose less of a structural impact upon the aircraft 132.

A forward barrier 142 is located on the upper deck 137 forward of the tank circuits 100 and is used to prevent and/or delay stray agent material that has inadvertently escaped from one or more of the agent tanks from moving on the upper deck into a portion of the aircraft 132 that is forward of the forward barrier. A mid-barrier 144 is located just forward of the two most aft of the agent tanks 106 of the two tank circuits 100 and is used to prevent and/or delay stray agent material forward of the mid-barrier from moving on the upper deck 137 aft of the mid-barrier. An aft barrier 146 is located between the set of the propellant tanks 102 and the set of the agent tanks 106 and is used to prevent and/or delay stray agent material from moving on the upper deck 137 forward of the aft barrier.

Figure 3:
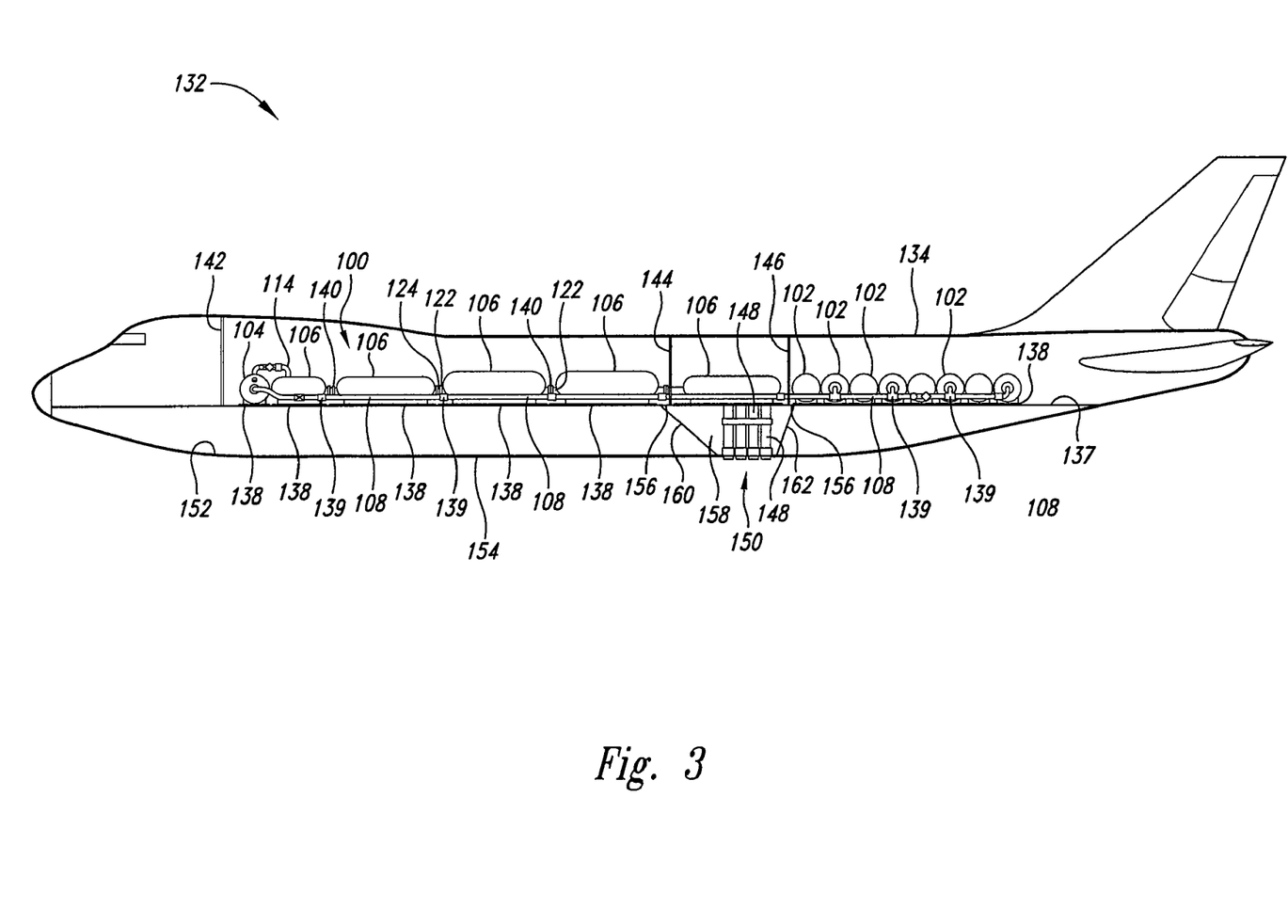
FIG. 3 is a side elevational view of the enhanced delivery system of FIG. 2.
Figure 4:
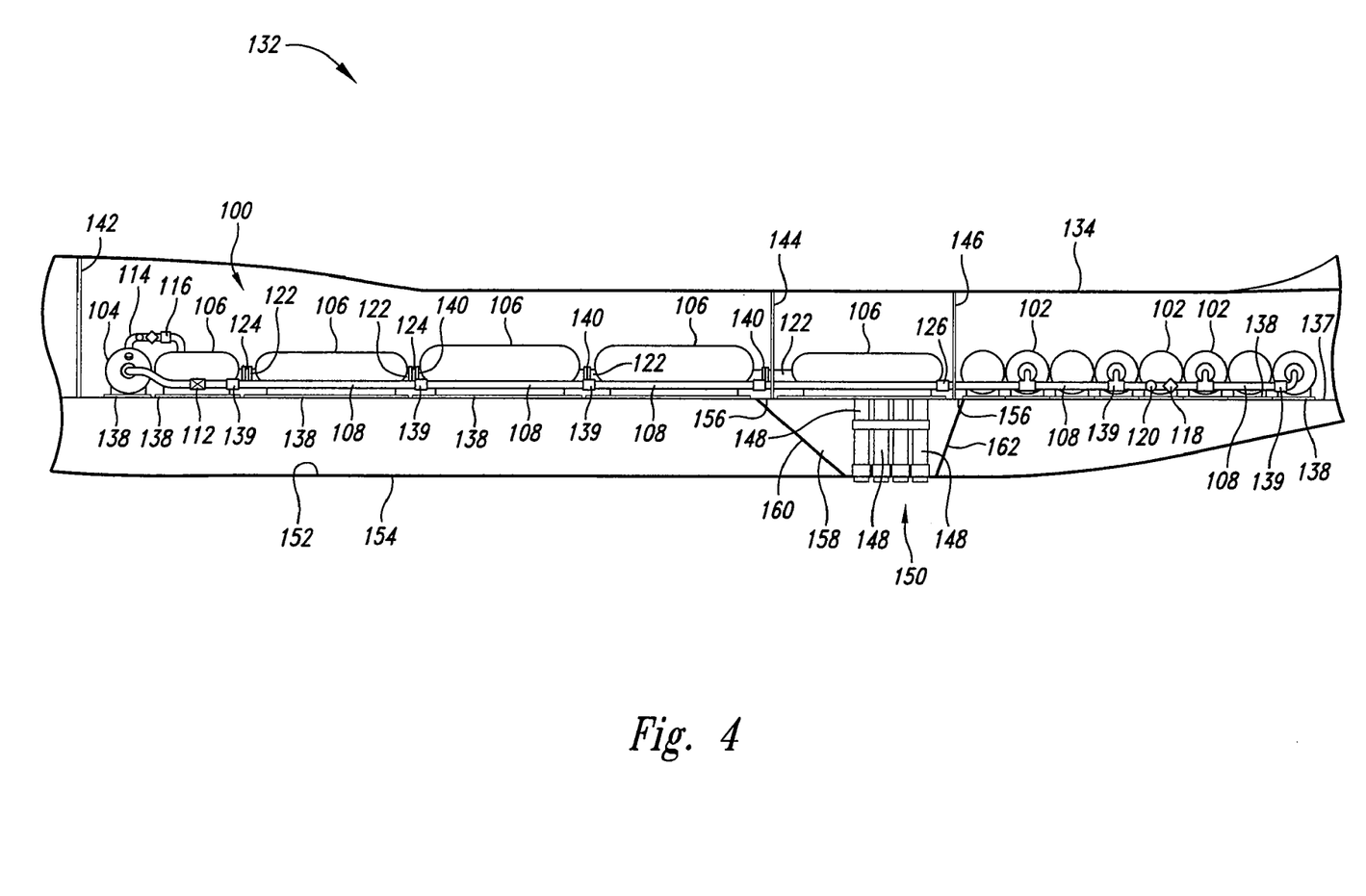
FIG. 4 is an enlarged fragmentary side elevational view of the enhanced delivery system of FIG. 3.

The forward barrier 142, the mid-barrier 144, and the aft barrier 146 are generally made from high strength to weight materials that can divert flow of fluids. These materials can include various plastics, other polymers, fabrics, other sorts of sheeting, and more rigid materials such as metals, composites and combinations thereof. The outlet valves 126 are fluidly coupled to outlet tubes 148 of an outlet assembly 150 located between the two most aft of the agent tanks 106. As better shown in FIG. 3 and FIG. 4, each of the outlet tubes 148 are large vertically oriented tubular structures that pass from the upper deck 137 through a lower deck 152 out through the aircraft bottom 154.

Figure 5:
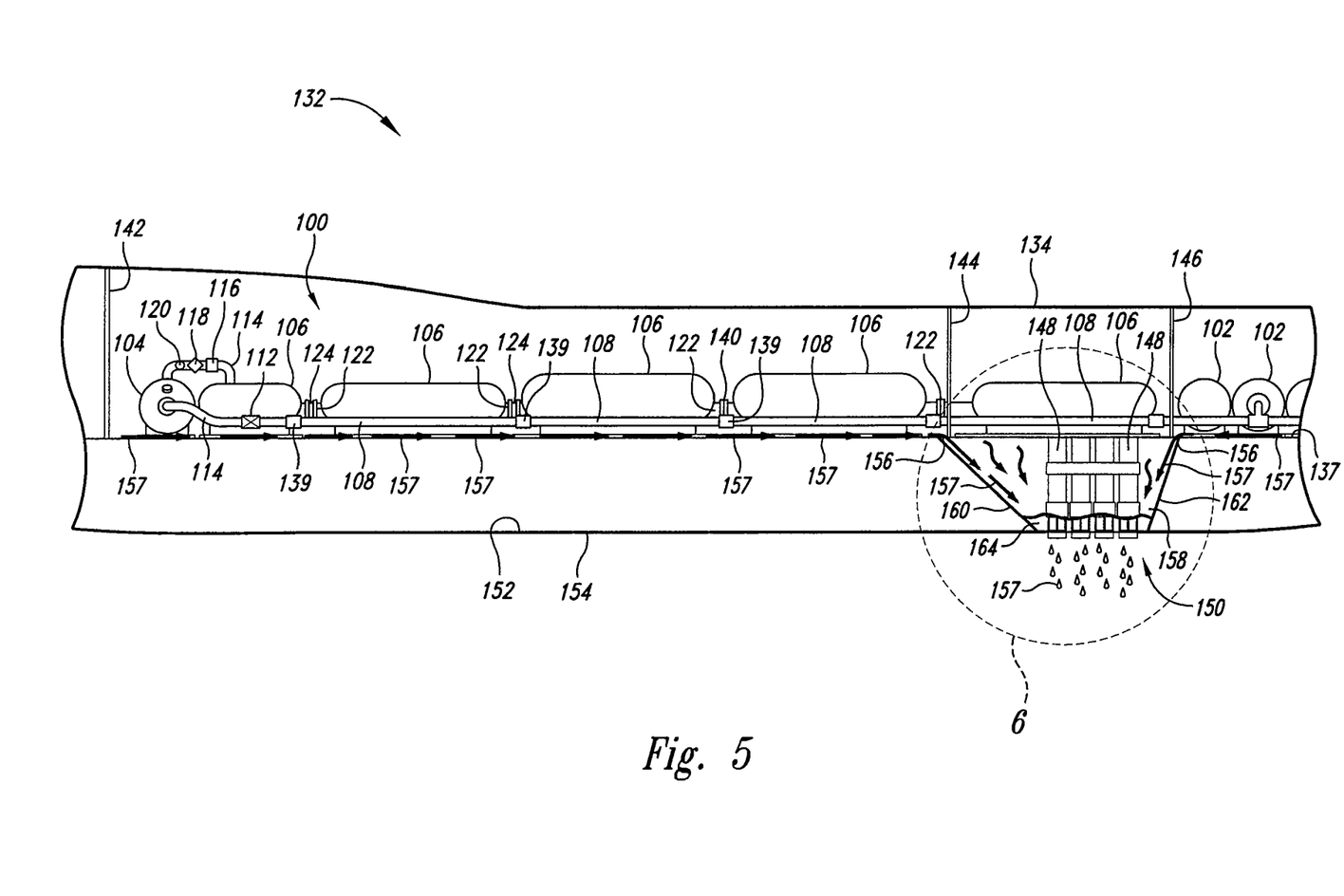
FIG. 5 is an enlarged fragmentary side elevational view of the enhanced delivery system of FIG. 3 better showing an outlet assembly.
Figure 6:
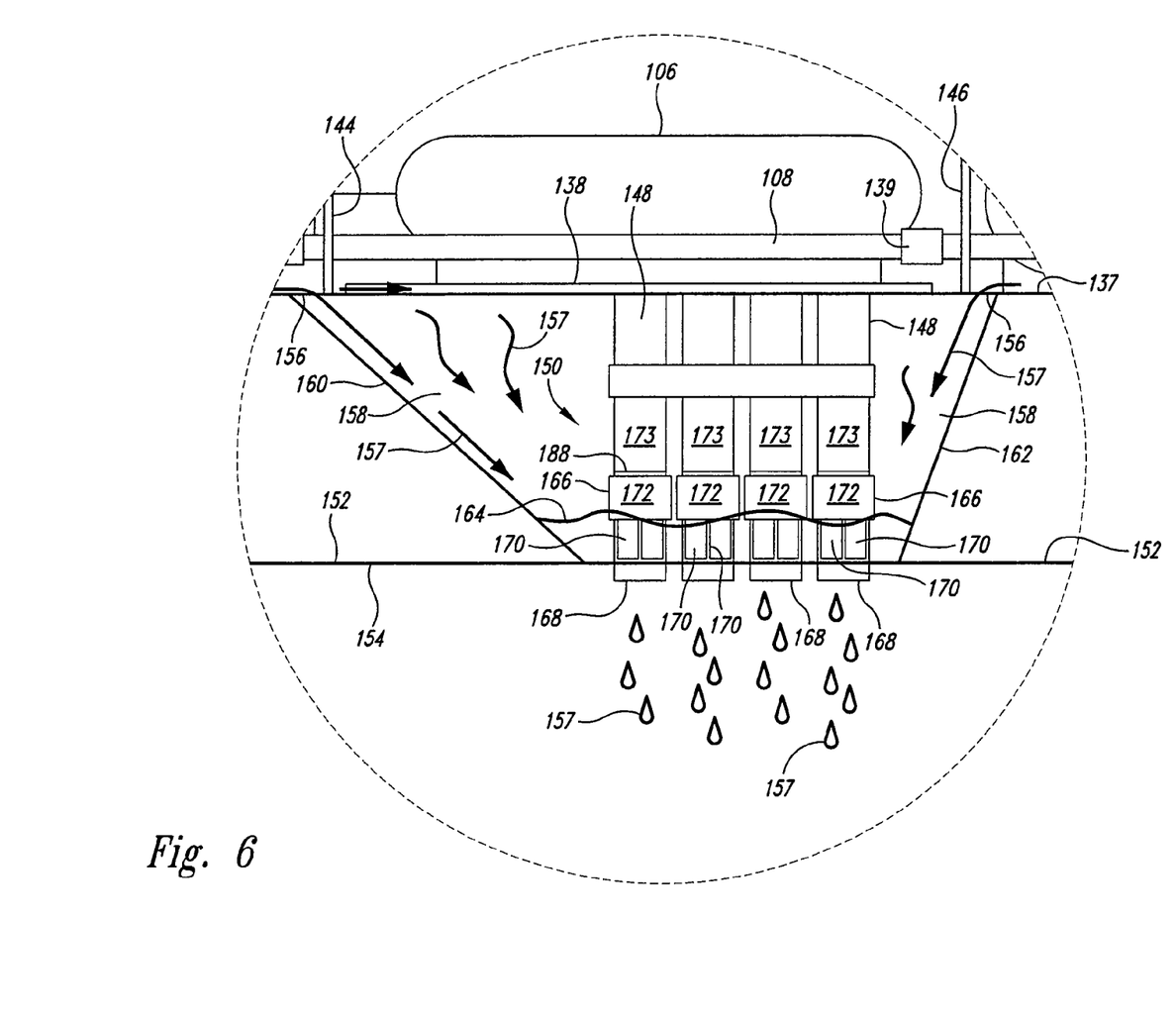
FIG. 6 is a further enlarged fragmentary side elevational view of the enhanced delivery system of FIG. 5 better showing detail of the outlet assembly.

One or more upper deck openings 156 are located in the upper deck 137 just forward of the mid-barrier 144, and/or located just aft of the aft barrier 146, and/or located between the mid-barrier 144 and the aft barrier 146. The upper deck openings 156 allow stray agent 157 on the upper deck 137 that has been diverted by the mid-barrier 144 and the aft barrier 146 to drain down toward the lower deck 152, as shown in FIG. 5 and FIG. 6. Lower deck openings 158 are located in the lower deck 152 typically below the upper deck openings 156 and/or nearer to the outlet assembly 150 to allow stray agent 157 to pass through to the aircraft bottom 154.

A forward ramp 160 and an aft ramp 162 serve to guide stray agent 157 passing through the upper deck openings 156 and the lower deck openings 158 toward the outlet assembly 150. Once the stray agent 157 reaches the aircraft bottom 154, it accumulates having a pool level 164. As the pool level 164 rises, it serves to lift floatable shutters 166 (see FIG. 6) or other sorts of door-like members having combined densities to be buoyant relative to the stray agent 157. The shutters 166 serve as portions of the outlet tubes 148 proximate to outlet ends 168.

Figure 7:
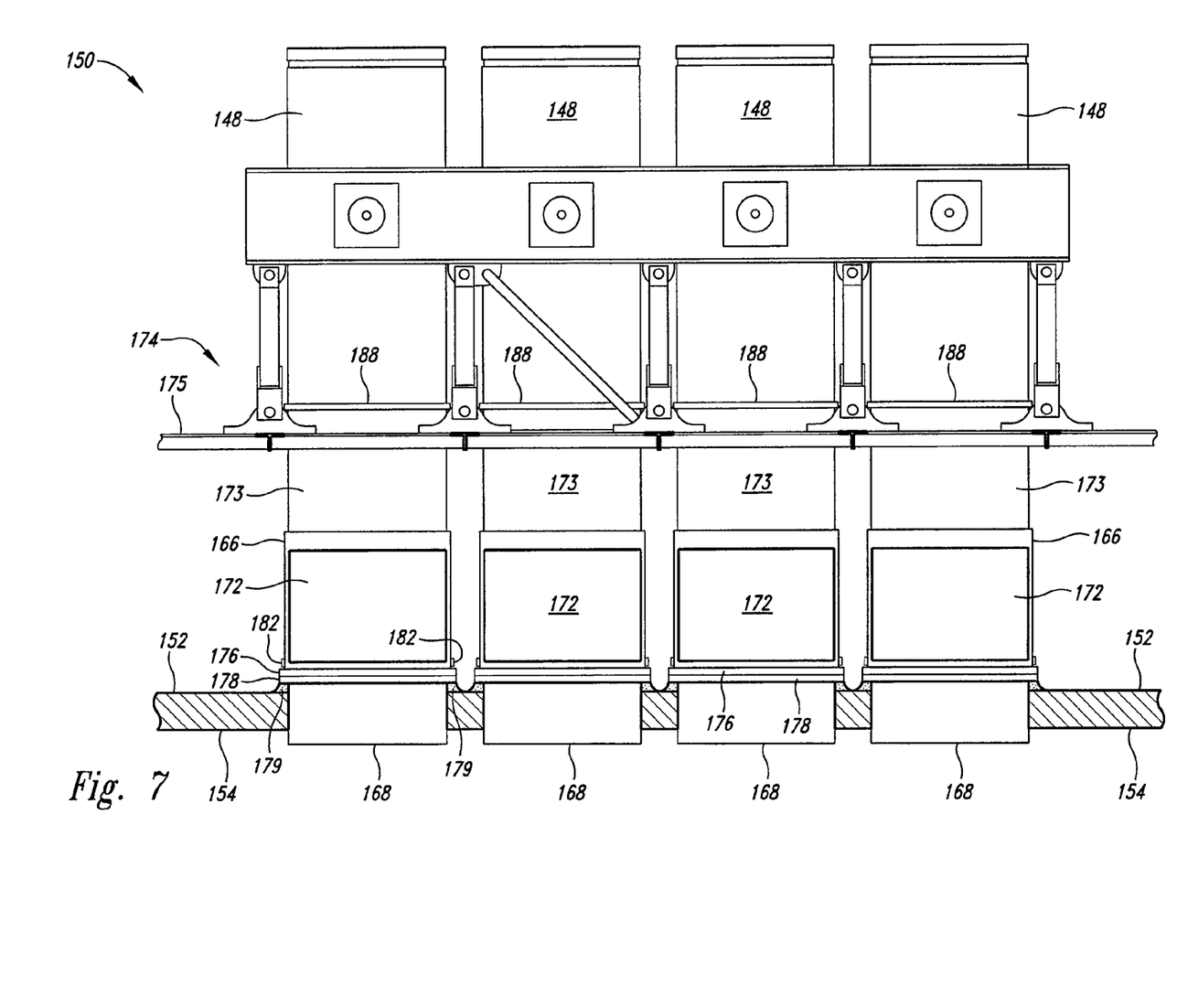
FIG. 7 is an enlarged side elevational view of the outlet assembly.
Figure 8:
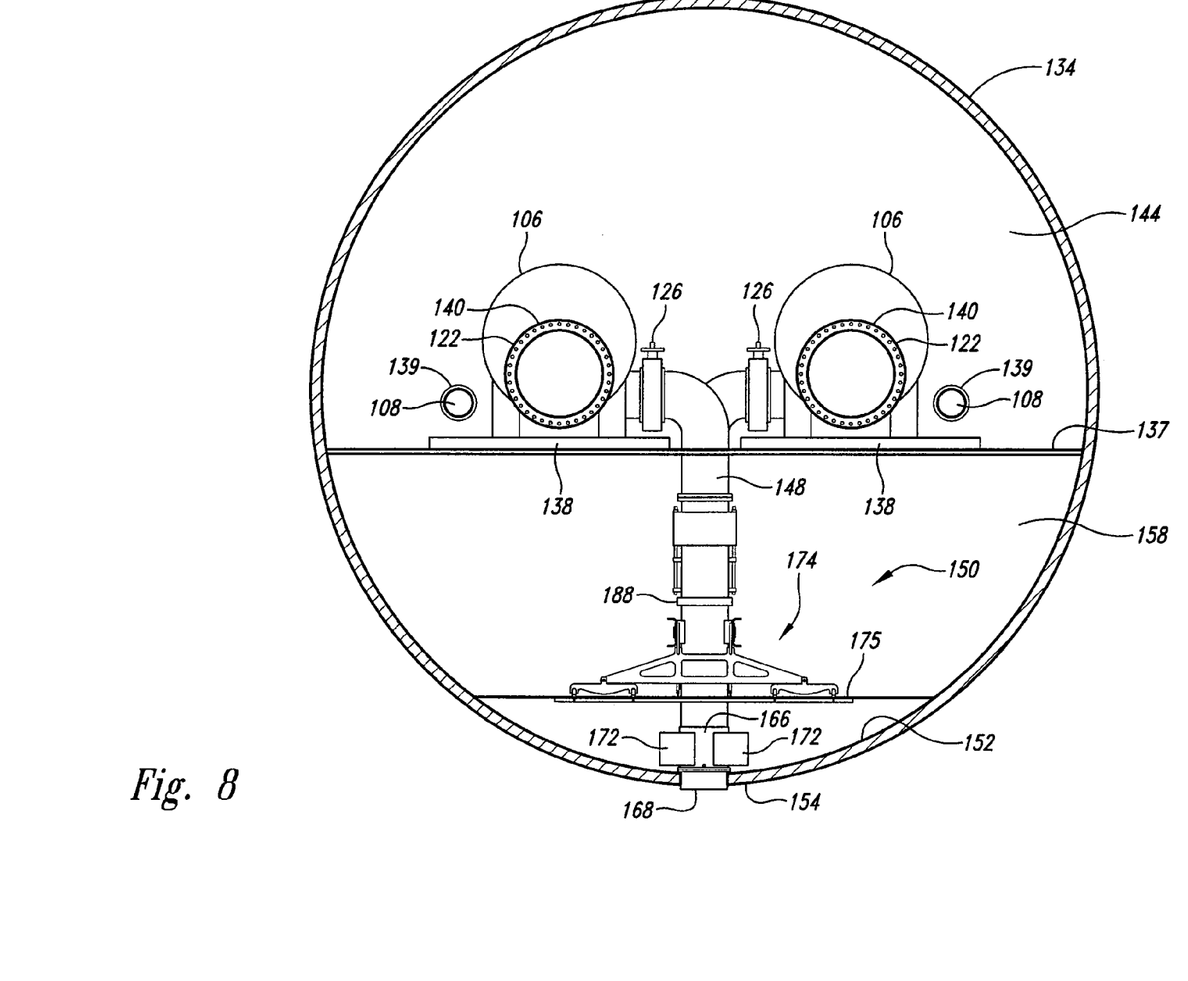
FIG. 8 is a front elevational view of the enhanced delivery system shown positioned within an aircraft taken substantially along lines 8-8 of FIG. 2.
Figure 9:
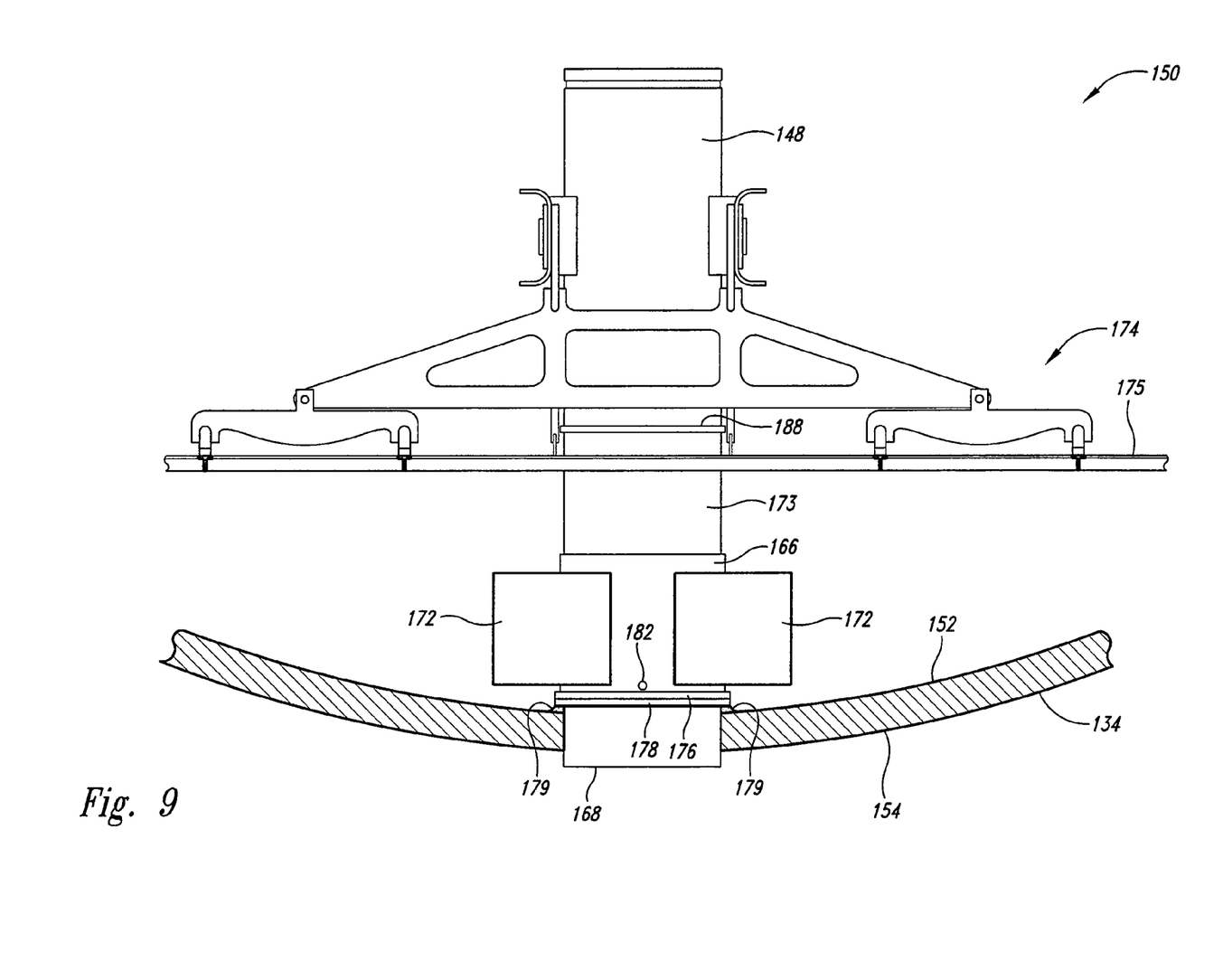
FIG. 9 is an enlarged fragmentary front elevational view of the enhanced delivery system positioned within the aircraft of FIG. 8.

Consequently, as the floatable shutters 166 are lifted, the stray agent 157 passes through tube wall openings 170 into the outlet tubes 148 to exit from the aircraft 132 through the outlet ends 168, as shown in FIGS. 7-9. The floatable shutters 166 include floats 172 coupled to or integrally structured with tube wall portions 173 of the assembly 150. The floats 172 add sufficient buoyancy to the tube wall portions 173 to allow the tube wall portions to be raised up along with a rise of the pool level 164.

Use of large aircraft, such as a Boeing 747, affords greater material carrying capacity so that large amounts can be dumped onto substantial areas of land at high concentrations given the configurations described above. To handle large volume deliveries, the outlet tubes 148 are sized with relatively large pipe diameters such as having 16 inch diameters in some implementations. With large pipe diameters for the outlet tubes 148 and substantially high pressure levels for the propellant tanks 102, such as 65 psi, a substantial amount of thrust induced force can result from the material in the material storage agent tanks 106 being shot out from the large diameter outlets at high pressure.

Conventional methods of securing outlets to an aircraft involve common techniques to secure pallets to the aircraft, such as with outer guide locks. Due to the unconventionally high amount of thrust that can result from material being delivered, these conventional outlet securing systems and methods can be inadequate in properly distributing the thrust induced load to an adequately sized portion of the aircraft to safely hold the outlet tubes 148 in place without risking structural damage to the aircraft 132.

An outlet securing system 174 is depicted in FIG. 8 to properly distribute the unconventionally high thrust induced loads to an adequately sized portion of the aircraft 132. The outlet securing system 174 couples the outlet tubes 148 to the aircraft by coupling to seat tracks 175 originally designed for securing cargo to the aircraft when the aircraft is used as a passenger airliner. Coupling the outlet tubes 148 to the aircraft by coupling the outlet tubes to the seat tracks 175 allows for a more secure way of imparting the thrust induced load to the aircraft structure than the conventional methods used involving securing pallets to the aircraft. Consequently, the outlet securing system 174 allows for delivery of greater quantities of material with pressures for the propellant tanks 102 substantially higher than used by conventional delivery systems.

Figure 10:
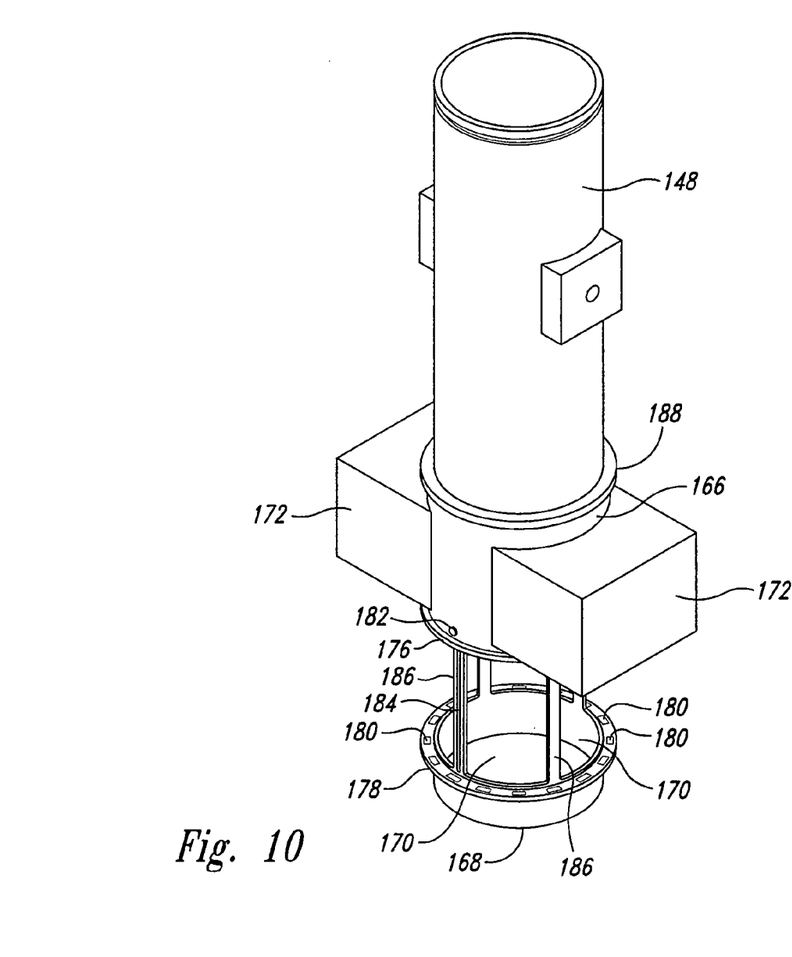
FIG. 10 is a perspective view of a portion of the outlet assembly of FIG. 7 shown in an open position.
Figure 11:
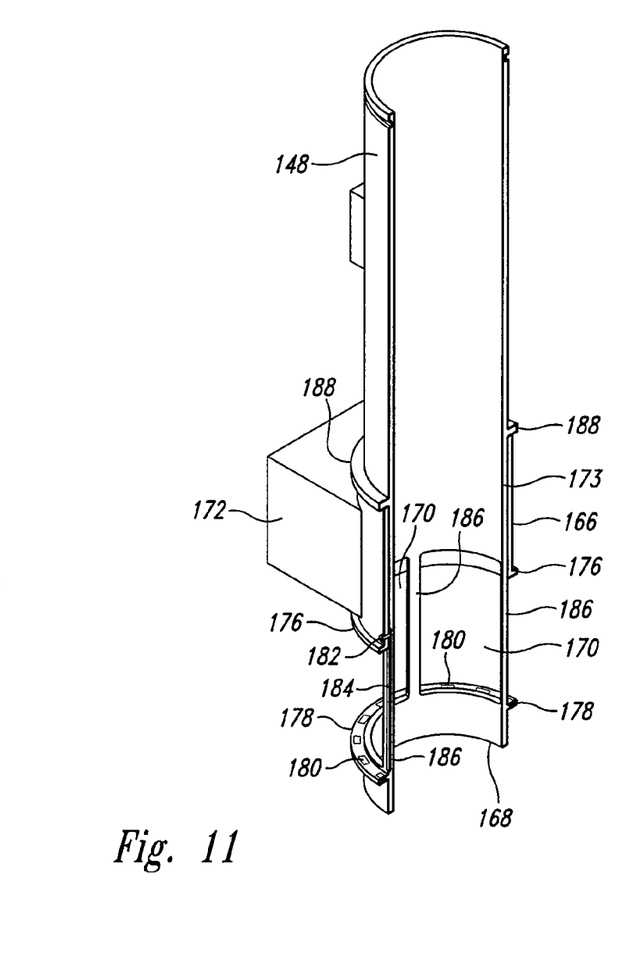
FIG. 11 is a cross-sectional perspective view of the portion of the outlet assembly of FIG. 10 shown in the open position.
Figure 12:
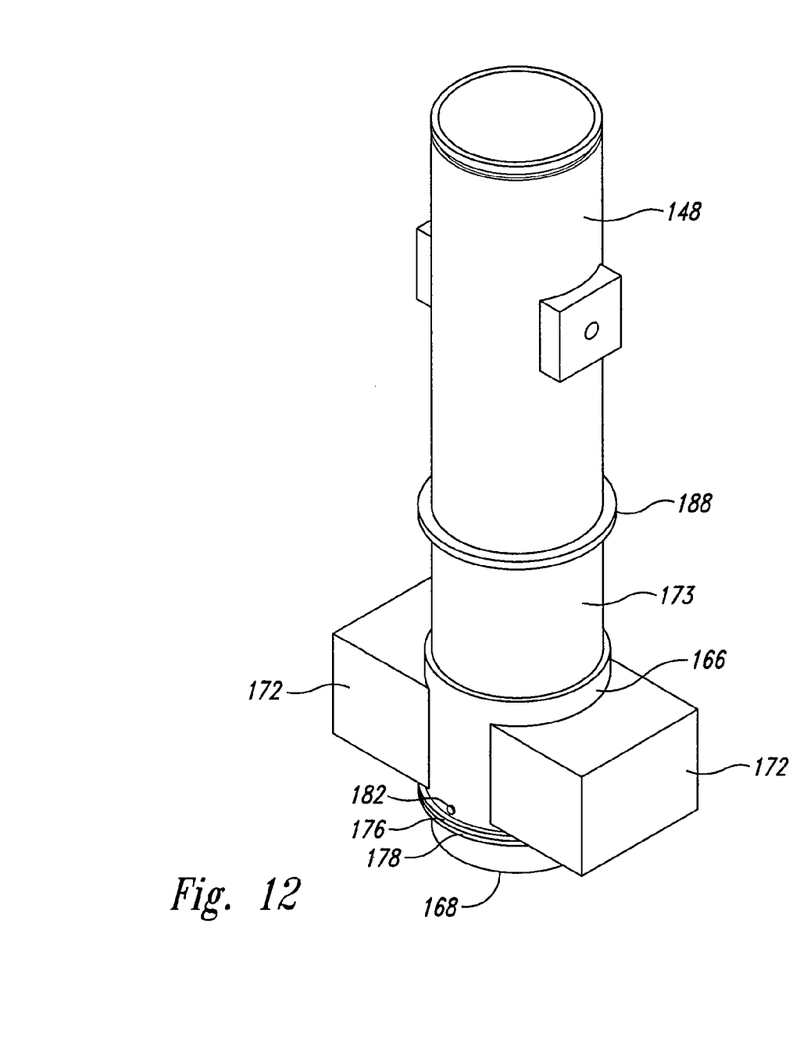
FIG. 12 is a perspective view of the portion of the outlet assembly of FIG. 10 shown in a closed position.
Figure 13:
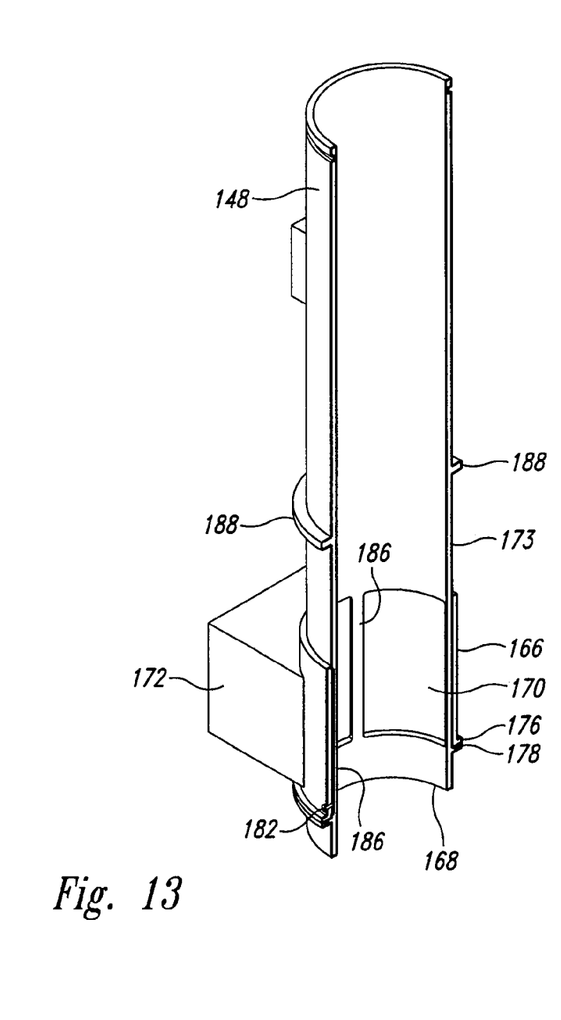
FIG. 13 is a cross-sectional perspective view of the portion of the outlet assembly of FIG. 10 shown in the closed position.

As shown in FIG. 9, the tube wall portions 173 each have a lower flange 176 that rests against an upper flange 178 of a different one of the outlet ends 168. Sealant 179 is used to seal the upper flange 178 with the fuselage 134. The upper flange 178 and/or the lower flange 176 contain magnets 180 as shown in FIG. 10 and FIG. 11 that help to seal each floatable shutter 166 in a closed position, such as shown in FIG. 12 and FIG. 13, when the pool level 164 is not sufficient to raise the floatable shutter. The magnets 180 help prevent the floatable shutters 166 from vibrating and bouncing up and down with aircraft movement.

A pin 182 protrudes from the interior surface of the floatable shutter 166 to engage with a track 184 found in a post 186 of the outlet tube 148. Each of the pins 182 help to prevent one of the floatable shutter 166 from rotating and thereby prevents the floats 172 from hitting each other. A circumferential ring stop 188 of the floatable shutter 166 is used to prevent travel of the floatable shutter beyond a desired vertical height but allows for sufficient vertical travel so that the floatable shutter can be raised to unblock the tube wall openings 170 as the pool level 164 rises.

The tank circuits 100 are self-contained and reusable and enable aircraft, such as but not limited to cargo/utility aircraft, to carry and dump a load, under control. One example of an aircraft among many, is a Boeing 747. The outlet assembly 150 allows a uniform and narrow material drop from relatively high altitudes compared with conventional approaches and a reduction in the amount of time material is suspended in the air due to its capability of delivering pressurized fluid directed substantially straight downward.

By "downward," it is envisioned that the aircraft bottom 154 will generally be the closest side of the fuselage 134 to the ground when the aircraft 132 is being support on the ground by its wheel system. The pressurized fluid or other material delivered from the outlet tubes 148 is directed straight down and exits the aircraft 132 with the material moving further downward away from the aircraft bottom 154. The contents are shot substantially vertically toward the ground not just substantially horizontally away from the aircraft and its turbulence.

Possible agents used in the tank circuits 100 can include those for fire fighting, such as used by a "fire bomber", for chemical decontamination, weather modification and oil spill decontamination, among other uses. The tank circuits 100 and outlet assembly 150 for use with a Boeing 747 can drop approximately 25,000 gallons of fluid in approximately 5 seconds from an altitude of approximately 2,500 feet above the ground.

The quantity of material delivered and duration of the deliveries will be controllable by the pilot at any flight regime the aircraft 132 is capable of operating in (i.e., altitude, airspeed, pressurized or unpressurized). The system's load has the ability to be dispersed in segmented drops or at one time.

A portion of the tank circuits 100 and the outlet assembly 150 can be coupled to the aircraft 132 at what is conventionally know as a wing box since it is a reinforced portion of the aircraft. The wing box typically runs through the lower portion of the fuselage 134 and ties the center wings 136 into the rest of the aircraft 132. Other large aircraft can also be used in addition to the Boeing 747, such as DC 10 aircraft, or Airbus 380 aircraft.

The multiple agent tanks 106 are used to increase the carrying capacity of the aircraft 132 while seeking to maintain a desirable center of gravity of the aircraft. In one aspect, the agent tanks 106 may be made of steel, however, other materials may be used such as polymers, plastics, composites, etc. as conventional practice dictates. Using the two tank circuits 100 provide the capability to premix materials, mix materials on-board or disperse two different materials separately. This would allow for a division of two separate materials, such as a dormant fire retardant material and an activator material. The dormant fire retardant material and the activator would be admixed close to the time of use. The number of valves controlling the outlet tubes 148 that are opened at selected times control the quantity of material ejected.

The propellant can be pressurized at different pressures to match requirements of different materials contained in different ones of the agent tanks 106. These materials to be stored in the agent tanks 106 include, but are not limited to, water, gels, powders, chemicals and biological agents used for decontamination, neutralization, weather modification, oil spill treatment and firefighting. The specific agent material is directed by pressurized propellant and is propelled through the outlet tubes 148 straight down or at a forward angle away from the aircraft at variable pressures. Ejected material can strike or interact with its intended target either with forward direction or slow into a rain-like state dependant on which pressures and altitudes are used. The propellant tanks 102 can store pressurized air or other gas as the propellant. The stored air (energy) is the propulsion system allowing fluid and/or materials to exit the aircraft. The propellant tanks 102 can be pressurized with bleed air from the airplane, air from an onboard compressor, or air from a ground supply. The agent tanks 106 are able to withstand any pressure delivered from the proximate propellant tank 104.

The outlet tubes 148 can be dump chutes, nozzles, etc. and can branch out from the outlet assembly 150 and act as the exit mechanism for the material and/or fluids. The outlet valves 126 can open individually, in combination, or all at once to acquire the desired flow rate through the outlet tubes. The control and/or operation of the outlet valves 126 can be by a hydraulic actuator or electromechanical system.

In yet another aspect, a drop controller, such as a microprocessor-based computer device, given flow rate and line length, can be used to calculate how many of the outlet valves 126 to open and at what time to provide exact flow rate management (e.g., levels of coverage, intensity of coverage).

In some implementations, the agent tanks 106 can be progressively sized so that tank size increases the more aft a tank is located. For instance, the forward most tank of each tank circuit 100 can be the smallest, the second forward most tank of each tank circuit can be next largest and so on. In the implementation shown in FIG. 2, the forward most one of the tank circuit 100 empties first, then the second most one of the tank circuit empties and so on. Emptying of the tanks continues to follow this sequential order from more forward tank to more aft tank until the most aft tank of the tank circuit 100 is emptied.

This particular order of emptying could be re-ordered depending upon how the propellant tanks 102 and/or the proximate propellant tank 104 are coupled to the agent tanks 106. Whatever the implementation, the agent tanks 106 are sized and positioned according to the order of emptying such that the overall center of gravity of the loaded aircraft stays within a forward most center of gravity limit point and an aft most center of gravity limit point. In a particular implementation, the center of gravity of the aircraft when the agent tanks 106 are full is near the forward most center of gravity limit point and is near the aft most center of gravity limit point when the agent tanks 106 are substantially empty.

It has been found that the sequential ordering of emptying of the agent tanks 106 starting from the forward most pair and ending at the aft most pair tends to have less complication involved so tend to have an acceptable level of reliability. Other scenarios involving more complicated ordering of emptying of the agent tanks 106 may not have an acceptable level of reliability given the influence of emptying of the agent tanks on the center of gravity of the aircraft. Consequently, when additional factors of safety are desired, it may be necessary to limit the number of the agent tanks 106 to a number that would allow a more reliable emptying of the tanks such as a sequential forward to aft emptying order rather than using additional of the agent tanks and thereby causing a more complicated emptying order.

The outlet tubes 148 are generally located along the longitudinal dimension of the aircraft 132 relatively near the trailing edge (the most aft edge) of inboard flaps of the aircraft in their extended position. The extended position of the inboard flaps is taken into consideration since the aircraft is generally traveling at reduced speed with the inboard flaps in an extended position at the time of dumping of the contents of the agent tanks 106. It has been found that in this area just aft of the trailing edge of the extended inboard flaps there is a minimal amount of turbulence to be dealt with. If the outlet tubes 148 are moved forward of the trailing edge of the inboard flaps or moved more aft toward the tail of the aircraft, there can be more turbulence, which can reduce the ability to delivery content of the agent tanks 106 to the ground generally below the aircraft in sufficient concentrations.

It has been found that using air pressurized in the propellant tanks 102 at over 40 psi, and preferably at over 50 psi and more preferably at or over 65 psi helps to deliver the contents of the agent tanks 106 to the ground at significantly high levels of concentration. For instance, in test runs, delivery concentrations to the ground as high as 14.8 gallons per square feet have been observed for pressures of 65 psi in the propellant tanks 102 with the positioning and orientation of the outlet tubes 148 as discussed above for drops from the aircraft 132 at 400 feet above the ground. The aerial fluid delivery system may be capable of association with an air- 
plane, helicopter, or balloon. Other aspects can include a faring housed over the outlet ends 168.

The discussion above is descriptive, illustrative and exemplary and is not to be taken as limiting the scope defined by any appended claims.

The invention claimed is:

1. A system to be transported by an aircraft, the aircraft including an external wall and having a forward portion and an aft portion, the system comprising:
   a first pressure device configured to reduce a pressure of a fluid entering into a first portion of the first pressure device from a first pressure to exit a second portion of the first pressure device at a second pressure, the second pressure being smaller than the first pressure;
   a second pressure device configured to reduce a pressure of a fluid entering into a first portion of the second pressure device from a first pressure to exit a second portion of the second pressure device at a second pressure, the second pressure being smaller than the first pressure;
   an outlet positioned through the external wall of the aircraft;
   a plurality of agent tanks configured to hold a material to be released from the aircraft, the agent tanks coupled to the outlet to transfer the material to the outlet, each of the agent tanks positioned in one of a first row and a second row of the plurality of agent tanks, the first row and the second row of agent tanks extending longitudinally along a portion of the aircraft located between the forward portion and the aft portion of the aircraft;
   a first low pressure propellant tank and a second low pressure propellant tank configured to hold a pressurized gas, the first low pressure propellant tank and the second low pressure propellant tank positioned within the aircraft forward of the plurality of agent tanks, the first low pressure propellant tank coupled to the first row of the plurality of agent tanks to transfer the pressurized gas to the first row of agent tanks and the second low pressure propellant tank coupled to the second row of the plurality of agent tanks to transfer the pressurized gas to the second row of the agent tanks, the first low pressure propellant tank coupled to the second portion of the first pressure device and the second low pressure propellant tank coupled to the second portion of the second pressure device;

a first plurality of high pressure propellant tanks configured to hold the pressurized gas, the first plurality of high pressure propellant tanks positioned within the aircraft aft of the plurality of agent tanks and coupled to the first portion of the first pressure device to transfer the pressurized gas at the first pressure to the first low pressure propellant tank at the second pressure through the first pressure device, the second pressure being sufficient to propel a portion of the material from the first row of agent tanks through the outlet; and a second plurality of high pressure propellant tanks configured to hold the pressurized gas, the second plurality of high pressure propellant tanks positioned within the aircraft aft of the plurality of agent tanks and coupled to the first portion of the second pressure device to transfer the pressurized gas at the first pressure to the second low pressure propellant tank at the second pressure through the second pressure device, the second pressure being sufficient to propel a portion of the material from the second row of agent tanks through the outlet.

* * * * *